United States Patent [19]
Wada et al.

[11] Patent Number: 4,953,051
[45] Date of Patent: Aug. 28, 1990

[54] COMPOSITE MAGNETIC HEAD

[75] Inventors: Toshiaki Wada; Masateru Nose; Junichi Nakaoka; Akio Murata, all of Mishima, Japan

[73] Assignee: Sumitomo Special Metal Co. Ltd., Japan

[21] Appl. No.: 247,518

[22] Filed: Sep. 22, 1988

[30] Foreign Application Priority Data

Sep. 24, 1987 [JP] Japan .................. 62-240239

[51] Int. Cl.$^5$ ............................................. G11B 5/147
[52] U.S. Cl. ................................... 360/126; 360/104
[58] Field of Search ............... 380/103, 126, 119, 125, 380/122, 104

[56] References Cited

U.S. PATENT DOCUMENTS

| | | | |
|---|---|---|---|
| 4,709,284 | 11/1987 | Endo et al. | 360/103 |
| 4,764,832 | 8/1988 | Enz et al. | 360/126 |
| 4,780,779 | 10/1988 | Pisharody et al. | 360/126 |
| 4,796,133 | 1/1989 | Kuriyama | 360/126 |
| 4,821,131 | 4/1989 | Gotoh | 360/103 |

Primary Examiner—David J. Severin
Attorney, Agent, or Firm—Watson, Cole, Grindle & Watson

[57] ABSTRACT

A composite magnetic head is disclosed which is characterized by the fact that a magnetic head slider part and magnetic head core pieces both made of non-magnetic ceramic and provided on each of the opposed surfaces thereof with at least one layer of soft magnetic film produced in the form of sheet and subsequently shaped as required are integrally joined through the medium of glass members interposed between the opposed surfaces so as to give rise to a magnetic gap and an electromagnetic transducer coil is wound on the magnetic head core pieces.

A composite magnetic head is further disclosed which is characterized by the fact that a magnetic head slider part and magnetic head core pieces, one made of an oxide magnetic material and the other made of a non-magnetic ceramic, are integrally joined through the medium of glass members interposed between pertinent opposed surfaces so as to give rise to a magnetic gap, the member made of the non-magnetic ceramic is provided on the opposed surface thereof with at least one layer of soft magnetic film produced in the form of sheet and subsequently shaped as required, and an electromagnetic transducer coil is wound on the magnetic head core pieces.

11 Claims, 3 Drawing Sheets

COMPOSITE MAGNETIC HEAD

BACKGROUND OF THE INVENTION

1. Field of the Invention

This invention relates to a composite type magnetic head of novel construction for use in a magnetic recording and replaying device such as a hard disc drive, and more particularly to a composite type magnetic head which is constructed to preclude a pseudo-gap and to be as capable of high-density recording and replaying of information as a thin film head, yet can be easily manufactured.

2. Description of the Prior Art

In recent years, in the field of magnetic recording devices, the so-called metal type recording media using a magnetic powder of high coercive force have been finding utility in such magnetic recording media as hard discs to meet the demand for further densification of recording signals.

The trend of such recording media toward adoption of increasingly high coercive force has necesitated enhancement of the intensity of the magnetic field to be formed in the magnetic gap on the side of the magnetic head performing the operation of magnetic recording and replaying. A MIG (metal-in-gap) head so constructed as to have a metal magnetic film of high saturation flux density disposed in the proximity of the magnetic gap has found acceptance for actual use.

As an example of the MIG head, the composite type MIG head produced by a process which comprises depositing such a metal magnetic film as a Fe-Al-Si alloy film by the vacuum deposition method or the spattering method on the surface forming at least one magnetic gap in a pair of magnetic head cores made of such an oxide magnetic material as Ni-Zn ferrite or Mn-Zn ferrite, fitting fast inside the end part groove of a non-magnetic slider a magnetic head core chip having the pair of core pieces integrally joined with a glass member, fusing the inserted magnetic head core chip with glass having a lower melting point than the glass used during the formation of the magnetic gap, and thereafter winding an electromagnetic transducer coil around the magnetic head cores has been known to the art.

Besides, the so-called monolithic type MIG head so constructed that a metal magnetic film is deposited on one of a pair of magnetic head cores of an oxide magnetic material and adapted to serve concurrently as a slider is simple in design and easy to manufacture.

The surface of deposition between the magnetic head core of oxide magnetic material and the metal magnetic film is prone to occurrence of a pseudo-gap due to the deterioration of the metal magnetic film during the initial stage of film formation or the fabrication strain remaining the magnetic head cores of oxide magnetic material. This pseudo-gap possibly gives birth to swells in the frequency characteristic of the replay output.

As a magnetic head promising to meet the demand for the densification of recording signals, the film head is expected to constitute the mainstream of high-density magnetic heads yet to be introduced in the future.

The film head has a construction such that magnetic cores (magnetic poles) and an electromagnetic transducer coil are formed and laid out with high accuracy on a substrate by the so-called photolithographic technique such as spattering etching, ion etching, or chemical etching during the course of manufacture.

The film head of this construction generally has a lower protective film, a lower magnetic pole, a gap insulating layer, a photoresist, an electromagnetic transducer coil, a photoresist, an upper magnetic pole, and an upper protective film sequentially superposed in the order mentioned accurately on a non-magnetic ceramic substrate by the aforementioned photolithographic technique.

The vertical film head, in the same construction as described above, has an electromagnetic transducer coil and a main magnetic pole formed by the aforementioned photolithographic technique on a magnetic substrate made of such an oxide magnetic material as Ni-Zn ferrite or Mn-Zn ferrite in such a manner that the magnetic substrate will function as another magnetic pole, i.e., an auxiliary magnetic pole.

Since the film head is manufactured by a procedure based on the semiconductor production technology as described in detail above, the magnetic cores (magnetic poles) and the electromagnetic transducer coil can be formed with high accuracy. It, therefore, possesses outstanding characteristics as a magnetic head particularly fit for the trend toward high-density recording.

The film head, however, has a complicated construction as compared with the aforementioned MIG head. The procedure for its manufacture, therefore, is complicated and diversified. The film head has a disadvantage that it is produced in poor yield and is expensive.

The electromagnetic transducer coil which is formed by the photolithographic technique generally has a thickness of about 2 $\mu$m and, therefore, finds limited room for improvement in the efficiency of electromagnetic transduction.

SUMMARY OF THE INVENTION

This invention, produced in the light of the true state of affairs of the prior art described above, is aimed at providing a composite type magnetic head so constructed as to preclude the occurrence of a pseudo-gap, the notorious drawback inherent in the MIG head, to exhibit a capacity as fit for high-density recording and replaying as the film head, permit very easy manufacture, and to be inexpensive to manufacture.

It has been now established that by making both a slider part and core pieces with a non-magnetic ceramic material, accurately disposing a metal magnetic film of high saturation flux density at a prescribed position on the opposed surfaces defining a magnetic gap through effective use of the photolithographic technique employed during the manufacture of the film head, utilizing the metal magnetic film for the formation of a magnetic path for recording and replaying, and forming an electromagnetic transducer coil in such a pattern as to be wound on core pieces similarly to the conventional electromagnetic head, the occurrence of a pseudo-gap liable to occur to the MIG head can be precluded and the production of the composite type magnetic head can be facilitated. This invention has been perfected based on this knowledge.

To be specific, this invention is directed to a composite magnetic head, characterized by the fact that a magnetic head slider part and magnetic head core pieces both made of non-magnetic ceramic and provided on each of the opposed surfaces thereof with at least one layer of soft magnetic film produced in the form of sheet and subsequently shaped as required are integrally joined through the medium of glass members interposed between the opposed surfaces so as to give rise to a magnetic gap and an electromagnetic transducer coil is wound on the magnetic head core pieces.

The present invention is further directed to a composite magnetic head, characterized by the fact that a magnetic head slider part and magnetic head core pieces, one made of an oxide magnetic material and the other made of a non-magnetic ceramic, are integrally joined through the medium of glass members interposed between pertinent opposed surfaces so as to give rise to a magnetic gap, the member made of the non-magnetic ceramic is provided on the opposed surface thereof with at least one layer of soft magnetic film produced in the form of sheet and subsequently shaped as required, and an electromagnetic transducer coil is wound on the magnetic head core pieces.

BRIEF DESCRIPTION OF THE DRAWINGS

Other characteristics and features of this invention will become more apparent from the description given in further detail hereinbelow with reference to the accompanying drawings in which.

DESCRIPTION OF THE PREFERRED EMBODIMENTS

Figure 1:
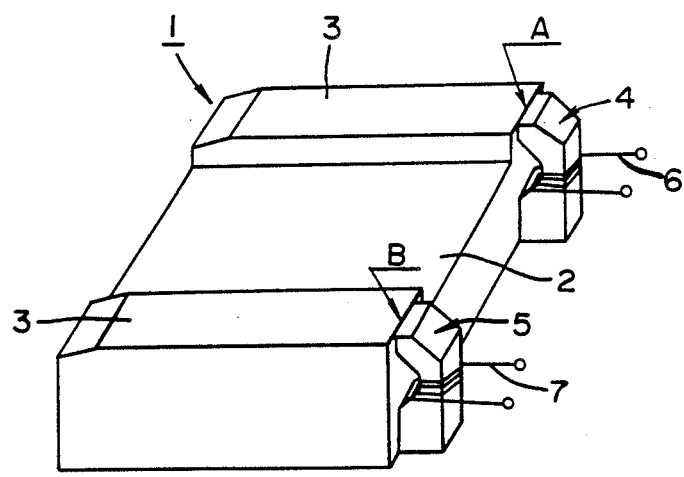
FIG. 1 is a perspective explanatory diagram illustrating a typical composite magnetic head of this invention as embodied in a head for longitudinal magnetic recording and replaying, having a magnetic head core piece exclusively for recording and a magnetic head core piece exclusively for replaying.

As examples of a non-magnetic ceramic to be employed for the production of the magnetic head slider part and the magnetic head core pieces of the present invention, all species of non-magnetic ceramics including the $ZrO_2$ type, $Si_3N_4$ type, MgO type, ferrite type, and $TiO_2$ type ceramics as well as the $Al_2O_3$ type ceramic may be mentioned.

For use in the vertical magnetic recording and replaying head, the oxide magnetic material to be opposed to the aforementioned non-magnetic ceramic may be any of the known materials such as Ni-Zn ferrite and Mn-Zn ferrite.

The glass members serving the purpose of integrally joining the magnetic head slider part and the magnetic head core pieces can be made of high melting glass such as borosilicate glass, soda-potash glass, potash crown glass, or soda-lime glass or low melting glass such as lead glass, zinc borosilicate glass, and zinc glass. Desirably the glass is properly selected to suit the material of which the magnetic head slider part and the magnetic head core pieces are made.

When members made of such a ceramic as $Si_3N_4$ type or SiC type ceramic which is readily oxidized on being held at an elevated temperature in air are integrally joined by fusion with glass, this union must be carried out in an atmosphere of an inactive or reducing gas such as Ar, $H_2$, or $N_2$.

The members for the formation of the magnetic gap can be made of $SiO_2$ or $Al_2O_3$ or of a high melting non-magnetic material such as the high melting glass mentioned above.

The soft magnetic film which is deposited characteristically of this invention on the opposed surfaces defining a magnetic gap is desired to be formed of a material in a shape with a thickness properly selected to suit the characteristics of the magnetic head which are required for the film to attain the formation of a magnetic path.

The soft magnetic film may be either a single-layer metal film of Ni-Fe, Fe-Al-Si, Fe-Al, Fe-Si, Fe, or such an amorphous alloy as Co-Nb-Zr or any of all the known soft magnetic multi-layer films, e.g., a multi-layer film having Fe-Al-Si and such an oxide as $SiO_2$ or $Al_2O_3$ alternately superposed, a multi-layer film consisting of a ferromagnetic Fe or Fe alloy possessing a bcc structure and Fe-Al-Si or a multi-layer film consisting of Fe-Si film and Ni-Fe film, Fe-C film and Ni-Fe film, Fe film and Cu film.

As the soft magnetic film for this invention, a soft magnetic film which in the entirety of film thereof possesses a high saturation magnetic flux density can be employed.

Specifically, the soft magnetic film is desired to possess, in the entirety of film thereof, a saturation flux density of not less 7 kG, preferably not less than 10 kG.

The coercive force of the soft magnetic film is desirably not more than 5 Oe, preferably not more than 1 Oe.

Optionally for the purpose of preventing the soft magnetic film and the non-magnetic ceramic from mutual diffusion and separation, a film of at least one metal selected from the group consisting of Cr, Ti, Mo, Ta, W, etc., or a film of the oxide of the metal selected to suit the soft magnetic film and the ceramic described above may be interposed between them.

The soft magnetic film can be formed by using any of the various known gaseous-phase film-depositing methods such as, for example, vacuum deposition, ion beam spattering, and plain spattering method. The shaping of the film formed as described above can be attained by using the photolithographic technique such as chemical etching, spatter etching, or ion etching. Thus, the film can be easily and highly accurately finished in a specific size, namely the track width of the recording and replaying cores, and disposed in place.

Where the magnetic head contemplated by this invention is to be used as a head for longitudinal magnetic recording and replaying, the aforementioned soft magnetic film is desired to be formed and disposed in a thickness in the range of 0.5 to 30 μm on the surfaces for coating of the magnetic head slider and the magnetic head core pieces both made of a non-magnetic ceramic.

If the thickness of the soft magnetic film is less than 0.5 μm, the recording and replaying waveform is liable to be deformed or the replaying output to be lowered. If the thickness exceeds 30 μm, the film gains unduly in stress and possibly undergoes separation to impair the productivity. Thus, the thickness is desired to be in the range of 0.5 to 30 μm.

Where the magnetic head of this invention is to be used as a head for vertical magnetic recording and replaying, either the magnetic head slider or the magnetic head core pieces are formed of a non-magnetic ceramic. The aforementioned soft magnetic film is desired to be formed and deposited in a thickness in the range of 0.1 to 1 μm on the surface for coating of the member made of the non-magnetic ceramic.

If the thickness of this soft magnetic film is less than 0.1 μm, the recording and replaying output is not sufficient. If the thickness exceeds 1 μm, the desired high-density recording can no longer be obtained. Thus, this thickness is desired to be in the range of 0.1 to 1 μm.

In the present invention, the shapes and configurations of magnetic head slider and magnetic head core pieces are desired to be properly selected so suit the various factors indicated in the working examples to be cited hereinbelow and the magnetic head characteristics to be required.

A magnetic head slider (1) shown in FIG. 1 is made of a non-magnetic ceramic material. A pair of rails (3) and (3) destined to form raised surfaces are formed projectingly in the lateral parts opposed to each other across an intervening central groove (2).

At the terminal parts in the longitudinal direction of the magnetic head slider (1), a magnetic head core piece (4) exclusively for recording and a magnetic head core piece (5) exclusively for replaying, which are each made of a non-magnetic ceramic material, are integrally joined with glass members (not shown) so as to give rise to a prescribed magnetic gap.

On the opposed surfaces of the pair of magentic head core pieces (4) and (5) and the magnetic head slider (1) which define the magnetic gap, soft magnetic films (not shown) possessing a high saturation flux density are severally formed and disposed.

Electromagnetic transducer coils (6) and (7), respectively for recording and replaying, are wound on the pair of magnetic head core pieces (4) and (5).

The part A of FIG. 1, namely the magnetic head part exclusively for recording, will be described in detail below.

Figure 4:
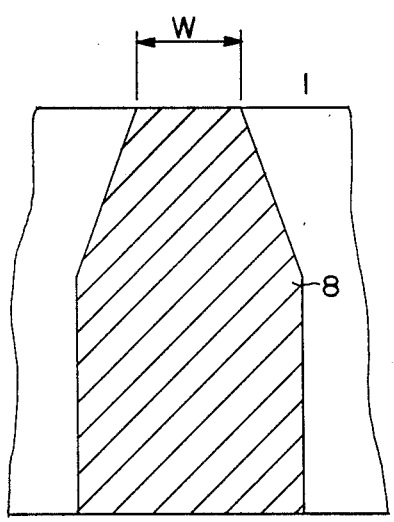
FIG. 4 is a front view illustrating a soft magnetic film.

The magnetic head slider (1) and the magnetic head core piece (4) which are integrally joined with a glass member (10) are each made of non-magnetic ceramic material. On the opposed surfaces of these two members, soft magnetic films (8) and (9) are formed and disposed in place. For example, the film (8) is shaped as shown in FIG. 4 in such dimensions that the width (W) thereof at the upper end part equals the width of track and, at the same time, the lower part thereof possesses a width enough to ensure efficient formation of a magnetic path, with the result that the so-called squeeze effect of magnetic flux is realized and the estimation of the height of magnetic pole is accomplished in accordance with the found value of the track width.

On the opposed surfaces of the magnetic head slider (1) and the magnetic head core piece (4) are respectively superposed the soft magnetic films (8) and (9). On these films (8) and (9) are further superposed gap-forming members (11) and (11) made of a high melting non-magnetic material and adapted to define a magnetic gap. These members (11) and (11) are integrally joined with a low melting glass member (10).

Figure 3:
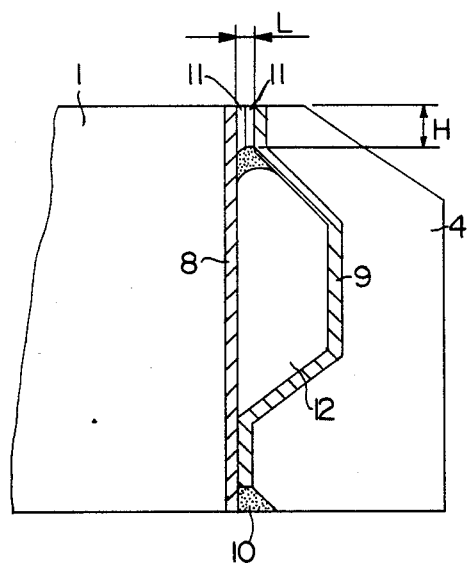
FIG. 3 a cross section taken along the line C—C of FIG. 2.

The magnetic head core piece (4) is shaped as shown in FIG. 3 so as to give rise to a coil groove (12) possessing a substantially trapezoidal cross section and destined to serve as a winding window for a coil. After the magnetic head core piece (4) is joined with the magnetic head slider (1), an electromagnetic transducer coil (not shown) is wound around through the medium of the coil groove (12) as shown in FIG. 1.

The shape of the magnetic head core piece (4) is not limited to that which is illustrated. Optionally, the coil groove may be formed by incising a groove (not shown) on the magnetic head slider (1) side.

Figure 2:
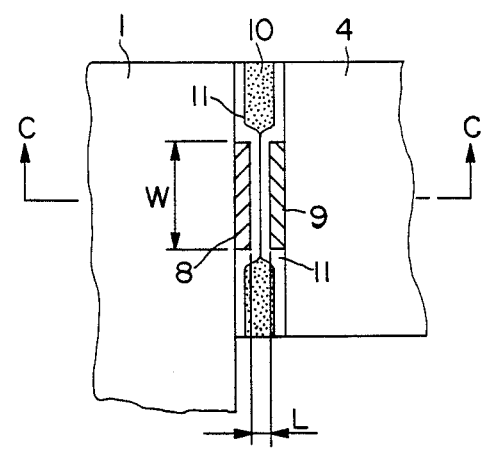
FIG. 2 is a plan view of detail A of FIG. 1 according to a first embodiment of the invention.
Figure 5:
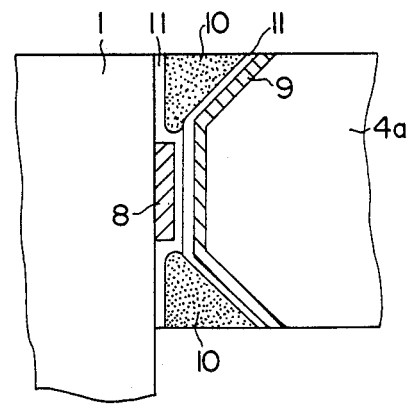
FIG. 5 is a view similar to FIG. 2 of a variation wherein the magnetic head core piece is of different shape.

In a variation illustrated in FIG. 5, a magnetic head core piece (4a) equals the magnetic head core piece (4) shown in FIG. 2, excepting the opposite leading ends thereof are cut off. A soft magnetic film (9) is formed and superposed on the entire surface of the magnetic head core piece (4a) opposed to the magnetic head slider (1). The configuration on the magnetic head slider (1) side is identical to that shown in FIG. 2.

The part B of FIG. 1 possesses the same construction as the aforementioned part A. As already pointed out, it is necessary that the dimensions of the magnetic gap should be selected to suit the functions to be required.

The embodiments have been described as being so adapted as to effect recording and replaying with two independent exclusive core pieces. By suitably selecting the dimensions of the magnetic gap, it is rendered possible to use one core piece concurrently for recording and replaying.

Even when the construction of FIG. 1 is altered in various manners as by adapting one of the magnetic head core pieces to be used exclusively for erasure of recorded information, this invention can be as effectively embodied as described above.

The composite type magnetic head of the present invention is so constructed that the magnetic head slider (1) and the magnetic head core pieces (4) and (5) are each made of a non-magnetic ceramic material, the soft magnetic films (8) and (9) are formed and disposed on the opposed surfaces of the slider and the core pieces, the slider and the core pieces are integrally joined through the medium of the gap-forming member (11), and the electromagnetic transducer coils are wound around the coil grooves (12) and (12) of the magnetic head core pieces (4) and (5). Owing to this construction, the composite type magnetic head manifests the following effects.

(1) The metal magnetic films formed at stated positions on the opposed surfaces defining the magnetic tape are superposed on the members made of the non-magnetic ceramic material. Even when the metal magnetic films suffer from deterioration of magnetic properties during the initial stage of film formation or from residual molding strain in the non-magnetic ceramic itself, therefore, they do not give rise to a pseudo-gap such as is observed in the conventional magnetic head core made of an oxide magnetic material.

(2) The component type magnetic head enjoys improved efficiency of electromagnetic transduction because the metal magnetic films of high saturation flux density disposed accurately by the photolithographic technique are adapted to give rise to a magnetic path during the course of recording and replaying and the electromagnetic transducer coils are wound around the core pieces.

(3) Since the component members of the magnetic head are made of a non-magnetic ceramic material, they are easy to fabricate. Further, the electromagnetic transducer coils are easy to manufacture as compared with those of the film head because they are adapted to be wound around the core pieces. Thus, the composite magnetic head possesses a capacity as fit for high-density recording and replaying as the film head, permits very easy manufacture, and proves to be inexpensive.

This invention has been so far described as adapted to serve for the operation of longitudinal recording and replaying. Alternative constructions of composite magnetic head can attain the advantages of the construction illustrated in FIG. 1 to FIG. 5, for example, by forming either of the magnetic head slider and the magnetic head core pieces with a non-magnetic ceramic and the remaining member with an oxide magnetic material and causing a soft magnetic film satisfying the aforementioned conditions to be disposed only on the member formed with the non-magnetic ceramic. Such embodiments are shown in FIGS. 6–9.

Figure 6:
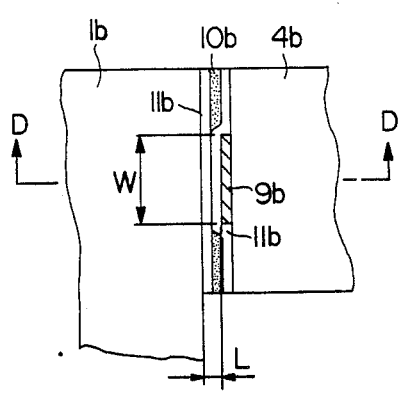
FIG. 6 is a plan view similar to FIG. 2 of an alternative embodiment.
Figure 7:
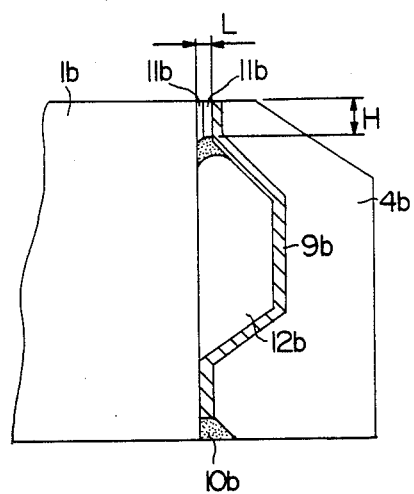
FIG. 7 is a cross section taken along line D—D of FIG. 6.

FIGS. 6 and 7 show an embodiment wherein the magnetic head slider 1b is formed of an oxide magnetic material, the magnetic head core piece 4b is formed of a non-magnetic ceramic, wherein gap-forming members 11b and a low-melting glass member 10b are provided and a soft magnetic film 9b is disposed only on a surface of the magnetic head core piece 4b which faces the slider 1b.

Figure 8:
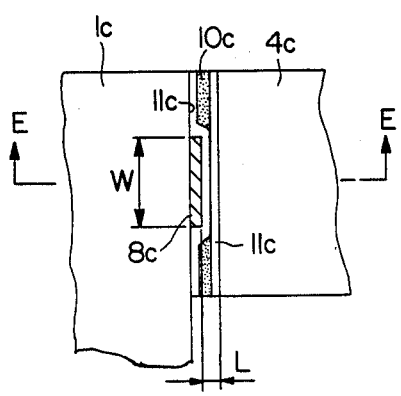
FIG. 8 is a plan view similar to FIG. 2 of a further embodiment.
Figure 9:
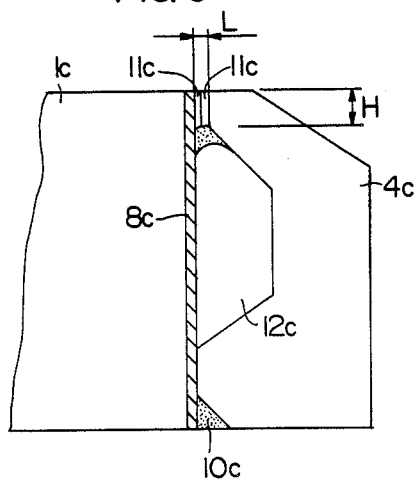
FIG. 9 is a cross section taken along line E—E of FIG. 8.

FIGS. 8 and 9 show an embodiment wherein the magnetic head slider 1c is made of a non-magnetic ceramic, wherein the magnetic head core piece 4c is made of an oxide magnetic material and the soft magnetic film 8c is disposed on the facing surface of the slider, gap-forming member 11c and low-melting glass member 10c being provided.

Now, the present invention will be described more specifically below with reference to working examples, which are meant to be purely illustrative, and not in the least limitative, of this invention.

EXAMPLE 1

A head for horizontal magnetic recording and replaying was produced in a construction illustrated in FIG. 1 to FIG. 4, using an $Al_2O_3$-$TiO_2$ type non-magnetic ceramic as the material for a magnetic head slider and magnetic head core pieces and disposing at positions required soft magnetic films having a Fe-Si-Al film, a $SiO_2$ film, and a Fe-Si-Al film sequentially superposed in the order mentioned.

Two kinds of $Al_2O_3$-$TiO_2$ type non-magnetic ceramic substrates, one kind measuring 50 mm (width)×50 mm (length)×4 mm (thickness) and the other kind measuring 50 mm (width)×50 mm (length)×1 mm (thickness), were prepared. The surfaces of these ceramic substrates were subjected to a mechanochemical polishing treatment to be finished with a roughness of not more than 300 Å. Coil grooves of a substantially trapezoidal cross section were formed in the substrates having a thickness of 1 mm.

On the two kinds of substrates, a soft magnetic film was deposited by superposing a Fe-Si-Al film 1.5 μm in thickness, a $SiO_2$ 0.01 μm in thickness, and a Fe-Si-Al film 1.5 μm in thickness sequentially in the order mentioned by the RF magnetron spattering method under the conditions of 5 mTorrs of Ar gas pressure and 1 kW of power.

These substrates were heat-treated under a vacuum of $2\times10^{-4}$ Torr at 550° C. for one hour and then cooled slowly.

The soft magnetic films produced as described above were shaped as required by the photolithographic technique using a mask for magnetic pole and a mask for track.

Then on the substrates, a $SiO_2$ film destined to serve as a magnetic gap-forming member was deposited in a thickness of 0.15 μm by the spattering method and a Cr film as a protective coating for a glass boundary was similarly deposited in a thickness of 0.1 μm.

A pair of the substrates constructed as described above were aligned at a prescribed position and were bonded to each other in an atmosphere of $N_2$ gas under the conditions of 600° C.×10 minutes with lead glass possessing a softening point of 450° C.

The bonded pair was cut to a prescribed size, incised with a groove leaving behind raised edges serving as rails, then subjected to diamond lapping to give rise to magnetic poles finished to a prescribed height, treated to form tapered faces for prominence, incised with notches laid perpendicularly to the groove mentioned above and adapted to guide a coil to be wound thereon, and severed into two core pieces with a cut inserted as illustrated in FIG. 1, to complete core pieces fit for the winding of a coil thereon.

An electromagnetic transducer coil was wound on the magnetic head core pieces a total of 30 windings. The component members of magnetic head were attached fast to a gimbal support with epoxy resin.

In the composite type magnetic head thus obtained, the track width, W, was 15 μm, the magnetic pole height, H, 2 μm, the magnetic gap, L, 0.5 μm (FIG. 2 to FIG. 4), and the amount of prominence 0.2 μm.

The composite type magnetic head of this invention constructed as described above was tested for output characteristic through the medium of a film possessing a coercive force, Hc, of 840 Oe. In the test, it manifested high output characteristic at least equivalent to that of the conventional film head up to the high frequency region.

The frequency characteristic of the replaying output was highly satisfactory, showing no sign of swell.

EXAMPLE 2

A head for vertical magnetic recording and replaying constructed as illustrated in FIG. 1 and FIG. 2 was produced, using a Ni-Zn ferrite substrate 50 mm (width)×50 mm (length)×4 mm (thickness) as the material for a magnetic head slider and a non-magnetic $Al_2O_3$-$TiO_2$ ceramic substrate 50 mm (width)×50 mm (length)×1 mm (thickness) as the material for magnetic head core pieces. In the present construction, no soft magnetic film (8) was formed on the slider (1) side.

The surfaces of the substrates were subjected to mechano-chemical polishing treatment to be finished with a roughness of not more than 300 Å. In the non-magnetic ceramic substrate, a coil groove having a trapzoidal cross section and destined to serve as a winding window was incised.

On the non-magnetic ceramic substrate, an amorphous alloy film was deposited as a soft magnetic film by the RF magnetron spattering method using a target of a composition of $Co_{87}Nb_5Mo_2Zr_6$. The thickness of the film at the leading end of the magnetic pole was 0.3 μm. The spattering was carried out under the conditions of 5 mTorrs of Ar gas pressure and 500 W of RF powder.

Patterns were formed in required shaped by the photolithographic technique using a mask for magnetic pole and a mask for track.

Then, a $SiO_2$ film destined to serve as a gap-forming material was deposited in a thickness of 0.15 μm by the spattering method on each of the two substrates.

A Cr film intended as a protective coating for glass boundary was formed in a thickness of 0.1 μm by the spattering method on the ceramic substrate.

The two substrates were aligned at a stated position and bonded to each other in an atmosphere of $N_2$ gas under the conditions of 470° C.×10 minutes through the medium of lead glass possessing a softening point of 360° C.

Thereafter, the bonded substrates were subjected to a heat treatment in an atmosphere of argon gas at 340° C. for 60 minutes while being rotated at 1,200 rpm in the magnetic field of 10 kG. Then, with a static magnetic field of 10 kG applied to the bonded substrates in a direction perpendiculer to the main magnetic pole, the bonded substrates were gradually cooled to normal room temperature.

Subsequently, the bonded substrates were cut to a prescribed size, incised with a groove leaving behind raised edges serving as fails, then subjected to diamond lapping to give rise to magnetic poles finished to a prescribed height, treated to form tapered faces for prominence, incised with notches laid perpendicualrly to the groove mentioned above and adapted to guide a coil to be wound thereon, and severed into two core pieces with a cut inserted as illsutrated in FIG. 1, to complete core pieces fit for the winding of a coil thereon.

An electromagnetic transducer coil was wound on the magnetic head core pieces a total of 30 windings. The component members of magnetic head were attached fast to a gimbal support with epoxy resin.

In the composite type magnetic head consequently produced, the magnetic pole height, H, was 10 μm, the track width, W, 10 μm, the main magnetic pole size (wall thickness) 0.3 μm, and the amount of prominence 0.1 μm.

This composite type magnetic head was tested for output characteristic through the medium of a vertical two-layer film. In the test, it manifested high output characteristic at least equivalent to that of the conventional film head up to the high frequency region.

What is claimed is:

1. A composite magnetic head which comprises a slider part and a core part, one of said slider part and said core part being made of an oxide magnetic material and the other of said slider part and said core part being made of a non-magnetic ceramic, said slider part and said core part being shaped to provide a coil groove therebetween for an electromagnetic transducer coil and also providing respective facing surfaces; a shaped layer of a soft magnetic material located on a portion of the facing surface of the part made of non-magnetic ceramic; a glass member located between said facing surfaces for joining said slider part to said core part; a gap-forming medium located between said shaped layer of soft magnetic material and the facing surface of the part made of oxide magnetic material; and an electromagnetic transducer coil wound around said core part and through said coil groove.

2. A composite magnetic head according to claim 1, wherein said oxide magnetic material is Ni-Zn type ferrite or Mn-Zn type ferrite.

3. A composite magnetic head according to claim 1, wherein said soft magnetic material possesses a thickness in the range of 0.5 to 30 μm.

4. A composite magnetic head according to claim 1, wherein said soft magnetic material possesses a thickness in the range of 0.1 to 1 μm.

5. A composite magnetic head according to claim 1, wherein said non-magnetic ceramic is an $Al_2O_3$-$TiO_2$ type ceramic.

6. A composite magnetic head according to claim 1, wherein said soft magnetic material is made of an Fe-Al-Si type alloy.

7. A composite magnetic head according to claim 1, wherein said soft magnetic material is made of a Co type amorphous alloy.

8. A composite magnetic head according to claim 1, wherein said soft magnetic material possesses a saturation flux density of not less than 7 KG.

9. A composite magnetic head according to claim 1, wherein said soft magnetic material possesses a coercive force of not more than 5 KOe.

10. A composite magnetic head according to claim 1, wherein said soft magnetic material is made of a multi-layer film.

11. A composite magnetic head according to claim 1, wherein a film of least one metal selected from the group consisting of Cr, Ti, Mo, Ta, and W or a layer of the oxide of said metal is interposed between said soft magnetic material and said non-magnetic ceramic.

* * * * *